(12) United States Patent
Cheng

(10) Patent No.: US 7,362,016 B2
(45) Date of Patent: Apr. 22, 2008

(54) BELT DRIVE SYSTEM WITH OUTER ROTOR MOTOR

(75) Inventor: Wei Cheng, Palatine, IL (US)

(73) Assignee: AEC-MotionStar, Inc., Schaumburg, IL (US)

( * ) Notice: Subject to any disclaimer, the term of this patent is extended or adjusted under 35 U.S.C. 154(b) by 0 days.

(21) Appl. No.: 11/436,444

(22) Filed: May 18, 2006

(65) Prior Publication Data

US 2006/0232147 A1   Oct. 19, 2006

Related U.S. Application Data

(62) Division of application No. 10/958,809, filed on Oct. 5, 2004, now abandoned.

(60) Provisional application No. 60/509,173, filed on Oct. 7, 2003.

(51) Int. Cl.
*H02K 9/00* (2006.01)
(52) U.S. Cl. .............. 310/52; 310/58; 310/64
(58) Field of Classification Search .......... 310/52, 310/54, 55, 57–59, 61–64, 60 A, 60 R; 198/788; 482/4, 51, 54
See application file for complete search history.

(56) References Cited

U.S. PATENT DOCUMENTS

| 1,733,379 | A | 10/1929 | Ludwig |
|---|---|---|---|
| 1,820,985 | A | 9/1931 | McKee |
| 3,188,833 | A | 6/1965 | Robinson |
| 4,198,191 | A | 4/1980 | Pierce |
| 4,871,934 | A | 10/1989 | Okamoto et al. |
| 4,943,746 | A | 7/1990 | Scherzinger et al. |
| 5,223,757 | A | 6/1993 | Staub et al. |
| 5,469,608 | A * | 11/1995 | Biancalani .............. 26/19 |
| 5,674,453 | A * | 10/1997 | Watterson et al. ......... 482/54 |
| 5,925,947 | A | 7/1999 | Kajiwara et al. |
| 6,095,951 | A | 8/2000 | Skowronski et al. |
| 6,443,875 | B1 | 9/2002 | Golen, Jr. et al. |
| 6,455,960 | B1 | 9/2002 | Trago et al. |
| 6,693,422 | B2 | 2/2004 | Lutz |
| 6,811,519 | B2 * | 11/2004 | Kuo ..................... 482/54 |
| 6,837,830 | B2 * | 1/2005 | Eldridge ................ 482/54 |
| 2002/0158543 | A1 | 10/2002 | Wolters |
| 2003/0094867 | A1 | 5/2003 | Wolters |
| 2005/0258701 | A1 | 11/2005 | Soitu |

* cited by examiner

*Primary Examiner*—Dang D Le
(74) *Attorney, Agent, or Firm*—Pauley Petersen & Erickson

(57) ABSTRACT

An outer rotor motor having a tubular shaft for maximum motor cooling effect. Coolant may flow through coolant channels of the shaft and the motor in various configurations to carry away the heat. A thermally conductive component may be inserted into the hollow shaft under the stator section to optimize the airflow and cooling. Physical construction of the motor and control algorithms may further enhance motor performance with appropriate sensors. A compact, smooth, and cool operating motor may thus be achieved for applications such as treadmills or other belt drive systems.

36 Claims, 9 Drawing Sheets

BELT DRIVE SYSTEM WITH OUTER ROTOR MOTOR

This application is a divisional of U.S. application, Ser. No. 10/958,809, filed on 05 Oct. 2004, now abandoned which claims the benefit of U.S. Provisional Application 60/509,173, filed on 07 Oct. 2003. The parent application is hereby incorporated by reference herein in its entirety and is made a part hereof, including but not limited to those portions which specifically appear hereinafter.

BACKGROUND OF THE INVENTION

1. Field of the Invention

The present invention is related to improvements for outer-rotor electric motor systems, particularly where the outer rotor is used to directly drive a belt, such as in treadmills and conveyors.

2. Discussion of the Related Art

Outer rotor motors are gaining popularity in many different commercial and residential applications since a direct-drive motor can simplify the overall system structure, increase system reliability and reduce system cost. Traditional treadmills and conveyors have a roller that is driven by conventional AC or DC electric motor through belts and pulleys. In addition, the AC or DC motor normally has a flywheel attached to achieve a smooth speed performance, such as in treadmill applications.

A typical outer roller motor has a rotating roller supported by end caps and bearings, and a stator and shaft. Permanent magnets are mounted cylindrically inside the roller and form magnetic poles. The stator is firmly mounted on the shaft. The shaft is fixed at both ends to its supporting frames. When the stator windings are energized, they interact with the magnetic field from the magnets and the torque is produced to turn the outer rotor of the motor.

Outer rotor motors can be used to directly drive a belt where the belt is led directly over the roller surface of an outer-rotor motor. However, challenges remain, especially in thermal cooling for motor surface temperature, motor smoothness at low speed, and motor response to load such as a step-fall on a treadmill belt. The major heat sources are the copper losses and magnetic core losses generated from the stator winding and lamination core. Motor torque ripple such as cogging torque will affect motor smoothness. The cogging torque is due to the interaction between the rotor magnets and the slots of the stator. This represents undesired motor torque output. The motor inertia and the performance of the motor controller contribute to how fast the motor reacts to load disturbances and variations such as step falls in treadmill applications and to the smoothness of the motor.

Improvement in treadmill applications is desired in each of these three areas. For an outer rotor motor, the stator is inside the rotor housing so heat removal is difficult. One approach is to attach fan type devices to the end caps as disclosed in US patent application publication nos. 2002/0158543 and US 2003/0094867. However, this approach may not be entirely effective to remove heat from inside the motor housing. For example, end caps having ventilation holes may not be effective at removing the heat when the motor is running at lower speed, and by having ventilation holes at both end caps, foreign objects may be sucked in and cause hazards. The motor described in U.S. Pat. No. 6,455,960 relies on the supporting structure for conductive heat dissipation which strategy may become less effective as the motor shaft becomes longer in applications such as treadmills. Also, in certain cases there may not be enough supporting structure available for conductive heat dissipation. In addition, the contact area of the shaft with the supporting frame may be limited, further reducing the effects of conductive heat transfer. As a result, at full load and lower speed, both methods cited above may have difficulties keeping the rotor surface temperature low. Higher rotor surface temperatures can have adverse effects on the life of the belt, and can make an outer rotor motor unsuitable for certain applications.

SUMMARY OF THE INVENTION

The present invention is directed to the improvement of belt driving systems using a brushless permanent magnet outer-rotor motor, such as in treadmill and conveyors applications, and particularly in treadmill applications where the load can vary and demands for the speed smoothness, speed response, and consistent and controllable belt speed are important. The belt driving system consists of at least one outer rotor motor, one roller, an endless belt and a motor controller. The outer rotor motor drives the belt at commanded speeds. The outer rotor motor is preferably a brushless permanent magnet motor with a sinusoidal back EMF waveform, and the controller can be a sine wave drive based on field orientation control algorithms.

The present invention is directed to three major issues of belt driving systems and in treadmill applications in particular: motor smoothness at low speed, motor response to load disturbance such as step fall, and motor surface temperature. By improving the cooling method of the outer rotor motor, such as by utilizing improved heat transfer by convection, the motor can be designed in smaller size and higher power density, and can run at higher efficiency, thus ensuring that the motor surface temperature stays lower to lengthen belt life. In certain conditions such as at light load, the cooling method according to the invention can remove heat generated by belt friction and friction with the deck or belt supporting structure. Thus, the lifetime of the system can be greatly improved.

The present invention can provide an outer rotor motor having coolant conducting channels to remove heat from motor by passing a coolant fluid (liquid or gas) through channels in the shaft or motor assembly, or both. The present invention can provide one or more paths to allow coolant to pass through the motor and prevent foreign objects, e.g. dirt, from being sucked into the motor such as by having relatively clean coolant such as cooling air come in from inside the supporting frame in treadmill applications. Apertures may be provided in the shaft or the stator core, or both, to provide coolant paths. The present invention can further provide a sealed motor housing for certain applications.

The present invention can provide an extended lifetime for its associated belt through the lower roller surface temperature at all speed range and load conditions by using additional cooling methods, such as a coolant pump or fan including blower for moving coolant into coolant channels. Such methods need not rely on the motor rotating speed and supporting structure. Alternatively, some methods can utilize apparatus which is associated with a rotating part of the outer rotor motor to increase coolant flow. For example, an additional passive fan may be provided that rotates synchronously with the roller. In some embodiments, a thermally conductive insertion rod can be inserted into the coolant channel inside a stator shaft to increase cooling effects. The inserted rod can be shaped, such as with fins, to increase heat transfer surface areas, for convection, conduction, or both. Such fins, or grooved channels, might be helically arranged to provide for additional coolant movement. Also, the surface of the shaft can be machined, forged or cast to provide such effects integrally.

The present invention can also reduce motor cogging torque and improve motor running smoothness especially at low speeds by using a motor with a fractional pitch stator winding with, for example, a 21 stator slot and 16 magnetic pole or 8 magnetic pole configuration. Using fractional pitch winding configurations reduces the net cogging torque by making the contribution of cogging from each magnet pole out of phase with those of the other magnets. The present invention can also improve motor running smoothness by using a magnet shaping method to change the geometric shape of the magnets so that the motor cogging torque is minimized and the motor smoothness is improved. The present invention can also improve motor running smoothness by skewing the stator slots or magnets at a small angle less than or equal to one slot pitch. The present invention can use any of the above cogging torque reducing methods singly or in combination to produce a belt driving system, such as a treadmill, of exceptional smoothness.

In order to achieve fast speed response to load conditions, such as step fall in a treadmill application, an advanced field orientation control algorithm can be used for the motor controller. Fast speed response and accurate speed control require accurate speed and position information of the rotor.

The present invention can also improve motor speed performance by using a high resolution speed and position sensor. It is particularly desirable in applications such as treadmills to have accurate motor rotor position and speed feedback information. One approach is to use an encoder. In one embodiment of the invention and unlike a traditional encoder having the encoder's disk mounted onto the rotating shaft, the encoder disk is mounted onto the rotating roller or end cap directly or through an adapter. The encoder-sensing device is then mounted onto the stationary shaft through a hub or adapter.

Another suitable high resolution device is a resolver. In one embodiment of the invention and unlike a traditional resolver that has the resolver rotor mounted to the rotating shaft and resolver stator mounted to the motor stationary frame, the rotor of the resolver is mounted onto the rotating roller or the end cap, and the stator of the resolver is secured to the non-rotating shaft.

An addition feature of the invention is to have an outer rotor motor designed to have sinusoidal back EMF for treadmill applications along with the sinusoidal current field orientation control method thus achieving minimum torque ripple and smoothness especially at low speed.

By providing an effective motor cooling method, a motor system according to the present invention can be run at higher efficiency and at lower surface temperature, increasing the life of the belt and making the system more reliable. By providing the above-discussed additional advantages to motor operation, a greater smoothness may be achieved in the belt drive systems of the present invention.

BRIEF DESCRIPTION OF THE DRAWINGS

The preferred embodiments of the present invention will be better understood by reference to the drawings where parts are designated by like numerals throughout.

DETAILED DESCRIPTION OF THE PREFERRED EMBODIMENTS

It will be readily understood that the components and methods of cooling, smoothness and fast response of the present invention, as generally described and illustrated in the figures herein, can be designed in a wide variety of different configurations and combinations depending on the specific application for a motor. Thus, the following more detailed description of the embodiments of the system and methods of the present invention, as represented in FIGS. 1-16, is not intended to limit the scope of the invention, as claimed, but is merely representative of the presently preferred embodiments of the invention.

Figure 1:
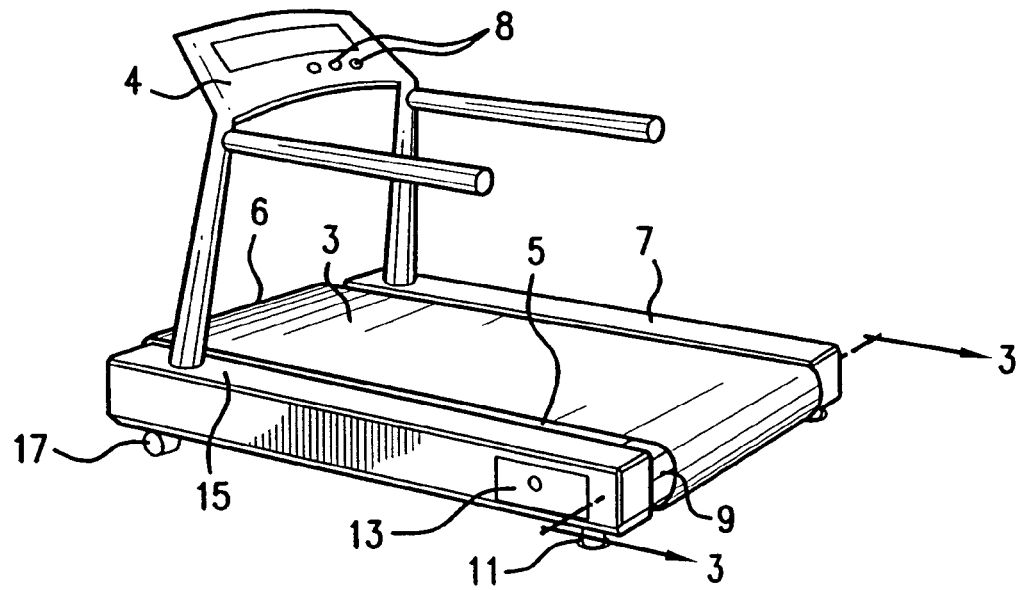
FIG. 1 illustrates a belt-driving system with an outer-rotor motor for a treadmill application.

In FIG. 1 a belt driving system configured as a treadmill is shown and includes a control panel 4 secured to a frame structure 7, 15 and operably connected to the control system 25 (FIG. 2) and wherein the control panel 4 includes at least a set of user controls 8 effective to permit a user to control the speed of a belt 3. The belt driving system comprises a direct-drive outer-rotor motor 9 forming a first roller i.e., pulley, and a second passive roller 6, i.e., pulley. The rollers 6, 9 rotatably cooperate to provide for longitudinal movement of the belt 3. Supporting structures are provided as further discussed below. The arrangement of the belt driving system of the present invention allows the motor 9, desirably to be mounted on the rear of a treadmill platform for increased belt drive efficiency since it acts to pull the belt 3. The two rollers 6, 9 are supported by frame structures 7, 15. Underneath the belt 3 is a supporting bed or deck 5. The frame structures 7, 15 may be supported by a pair of supports 11 and a pair of wheels 17. A motor controller 50 (FIG. 2) is mounted inside one of the side frame structures 7, 15 and can be accessed through a panel 13 in the frame structure 15.

Figure 2:
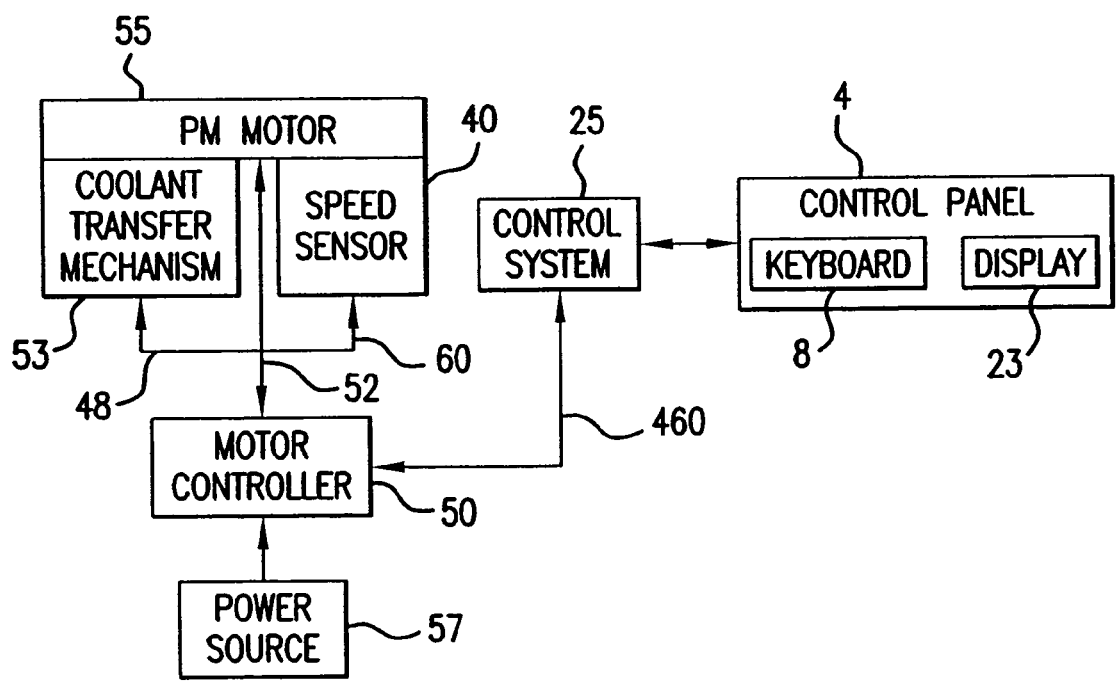
FIG. 2 is a block diagram of the treadmill system of FIG. 1.

In FIG. 2, a control block diagram of a treadmill system primarily includes a control panel 4 with user control keyboard 8 and display 23, a control system 25, a motor controller 50 and a permanent magnet motor 55 which has a high resolution rotor position and speed sensor 40 and a cooling mechanism 53 configured inside. A user can send commands such as desired belt speed through treadmill control system 25 which can be a part of the control panel assembly 4 to motor controller 50. The motor controller 50 will control the motor 55 to follow the user's speed command. The motor controller 50 can also send motor control status back to the treadmill control system 25 that then makes the necessary information available to the user on the panel display 23. The motor controller 50 accepts standard AC power input 57 such as 110 VAC and 230 VAC.

Figure 3:
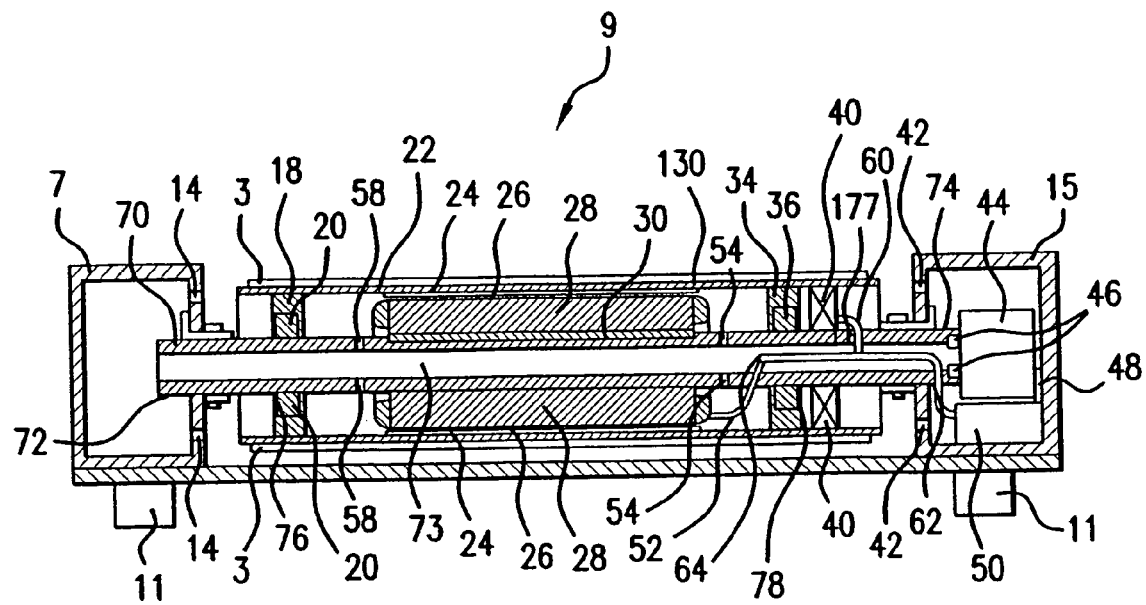
FIG. 3 is a cross sectional view of the belt-driving system along line 3-3 of FIG. 1.

In FIG. 3, a cross section of the belt driving system viewed along line 3-3 of FIG. 1 is shown. The outer rotor motor 9 is supported at both ends of a stator shaft 70 by the side frames 7, 15. The tubular portion of the shaft 70 forms a central coolant channel 73. The shaft 70 is non rotatable and is fixed in position such as by the clamping system as discussed with respect to FIG. 4 below. The side frames 7, 15 can have multiple slots 14, 42 for air ventilation. An electric fan 44 is preferably mounted by screws 46 into a first end 74 of the stator shaft 70 to move a coolant fluid, in this embodiment, a gas such as air, through the coolant channels 73. It will be appreciated that coolant transfer mechanisms 53 such as fans or pumps or like devices that can operate independently of the rate of rotor rotation in the context of the present invention. The fan 44 is electrically connected by a wire 48 to the motor controller 50 and can be turned on and off by the motor controller 50. Use of the electrically powered fan 44 may lower motor winding temperatures by about 30 degrees centigrade (C) in some applications such as a treadmill.

The outer-rotor motor 9 comprises the stator shaft 70, the stator 28, the rotor 22 which includes roller housing 130 and magnets 24, a pair of rotor end caps 18, 34 and a high resolution rotor sensing mechanism 40. The stator 28 is firmly mounted to the shaft 70 such as by a key 30 to prevent the stator 28 from rotating. In this embodiment, the rotor 22 is rotatably supported by its end-caps 18, 34 and bearings 20, 36. In certain cases, the rotor 22 can be supported directly by the bearings 20, 36 and the end-caps 18, 34 can be eliminated. Two C-shaped snap rings 76, 78 are used to secure the bearings 20, 36 and prevent axial movements along the stator shaft 70. The lead wires 52 from stator 28 go through apertures, i.e., holes 62, 64 in the stator shaft 70, to connect to the motor controller 50. The sensor mechanism 40 generally has two sections. One section is attached to the rotor 22, and the other section is clamped to the stator shaft 70, as further discussed below. Sensor mechanism lead-wires 60 go through hole 177 in the stator shaft 70 to connect to the controller 50. When the fan 44 is on, air flows in at the first end of the shaft 74 through the central coolant channel 73 and out at a second end of the shaft 72. Portions of the cooling air can also flow through hole 54, through motor air gap 26, then though holes 58 to remove heat from inside the motor 9. The exemplary holes in the stator shaft 70 are for illustrative purposes. There can be multiple holes for each stated purpose and the holes need not be at a 90 degree angle to the shaft wall surface.

In applications that require a sealed motor, the ventilation holes 54 and 58 on the shaft preferably no longer exist. Holes for lead wires 64, 62 and 177 of the motor and the sensors to come outside will be sealed. The heat generated by the stator 28 can be removed by the air that flows through the coolant channel 73.

Figure 4:
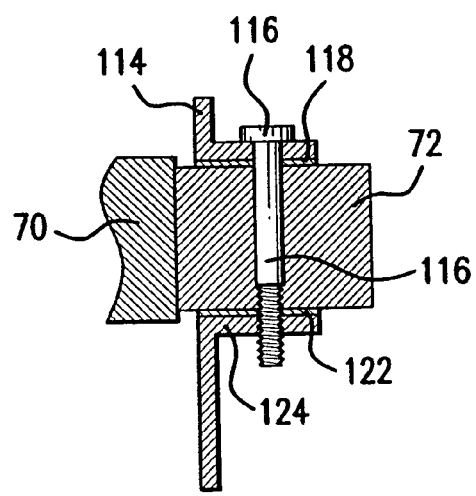
FIG. 4 illustrates a clamping structure for the stator shaft.

In FIG. 4 the clamp mechanism of the ends 72, 74 of the stator shaft 70 are shown. The ends 72, 74 of stator shaft 70 are clamped down at both ends by top and bottom L shape clamps, 114 and 124 respectively, with clamping screws 116. A vibration absorptive resilient material 118, 122 such as an elastomeric type material can be interposed between clamps 114, 124 and the ends 72, 74 of stator shaft 70 to insolate the frame 7, 15 from motor vibration and noise. Also, because in this embodiment heat is primarily transferred out by coolant flow rather than conduction through the mounting system, the resilient material can have a relatively low level of thermal conductivity. Other thermal insolating material such as ceramic can be used to prevent heat transfer from the stator shaft 70 to the frame 7, 15. For example, in the treadmill applications, it is desirable to insulate the frame from sources of heat to protect finishes.

Figure 5:
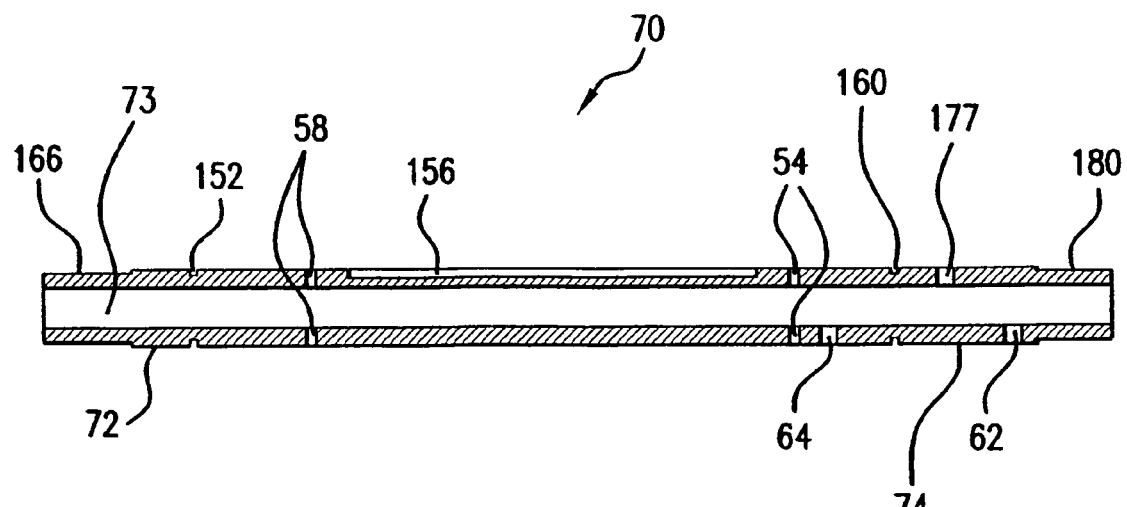
FIG. 5 is a cross sectional view of the stator shaft.

In FIG. 5 an exemplary tubular stator shaft 70 is shown. Flat areas 166, 180 are configuring in the ends 72, 74 of the stator shaft 70 for clamping. The plurality of holes 54, 58, 62, 64, 177 in the wall of the stator shaft 70 allow for cooling air or wires to pass in and out of the stator shaft 70. Grooves 152, 160 on the wall of the stator shaft 70 used in conjunction with C-shaped snap rings 76, 78 (FIG. 3) serve to prevent the bearings from moving along the axial direction. A notch 156 on the stator shaft 70 fits the key 30 (FIG. 3) to prevent stator 28 from rotating. In the case of a skewed stator, the notch 156 is not necessary.

Figure 6:
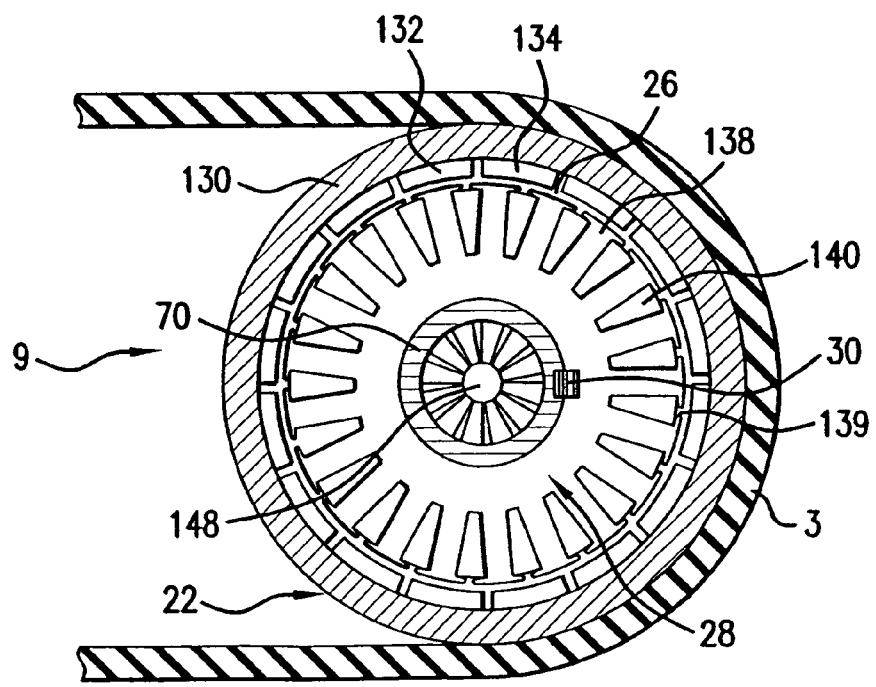
FIG. 6 is a cross sectional view of the outer-rotor motor.

FIG. 6 shows a cross sectional drawing of an exemplary outer-rotor motor 9 with belt 3. The exemplary motor 9 is twenty-one slots 139, sixteen pole 132, 134 outer-rotor motor 9. The rotor 22 with its associated roller housing 130, i.e., that part of the rotor sleeve outside of the magnet mounting area, drives the belt 3. It will be understood that a roller sleeve or the roller housing may encompass other structures whereby the drive surface need not have the magnets of the motor directly mounted therein. The belt 3 may be pre-tensioned to prevent belt slip. Magnets 132, 134 are mounted cylindrically inside the roller housing 130. The roller housing 130 may be made of ferric material and functions as the magnetic flux return path. The thickness of the housing 130 should meet both mechanical strength and no flux saturation requirements. Secured to the stator shaft 70 is a stator core lamination 138. The air gap 26 exists between the rotor 22 and the stator core lamination 138. An exemplary slot 139 retains copper windings 140 of the stator 28. The key 30 is used to prevent the stator 22 from rotating on the stator shaft 70. An aluminum or otherwise thermally conductive member 148 may be placed in the coolant channel 73 underneath the stator core lamination stack. The shape of the member 148 is not limited to the finned shape shown. As discussed, alternative forms of shapes for the interior or exterior surface area of the shaft 70 may be had for increasing the contact area with the cooling air. The member 148 increases the heat transfer area with the cooling air moving through the coolant channel 73. By changing the shape of the member 148, the air pressure between through-holes 54, 58 in the shaft 70 may be adjusted so that the cooling air flowing through the air gap 26 can be optimized along with the cooling air flowing through the coolant channel 73. A finned member 148 as shown and discussed herein may further lower motor winding temperatures by 10 degrees Celsius.

Figure 7:
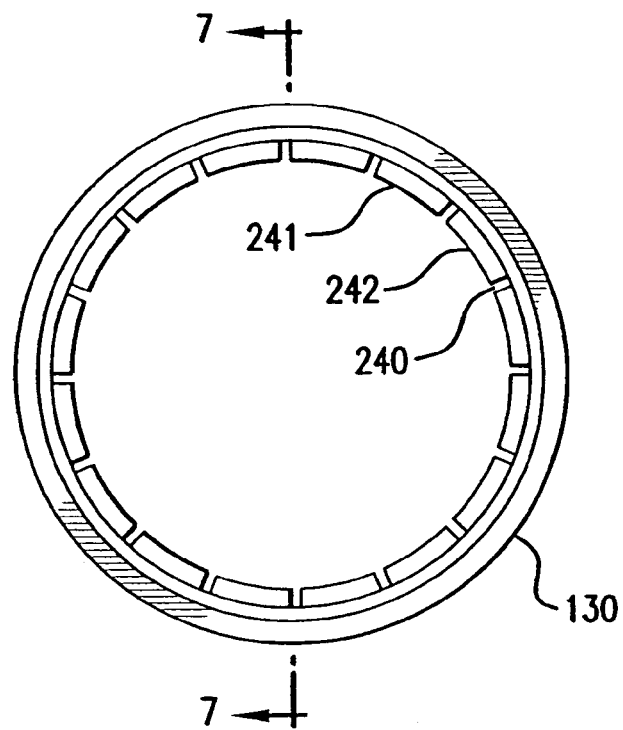
FIGS. 7 and 8 are end and side cross section views respectively of a rotor.
Figure 8:
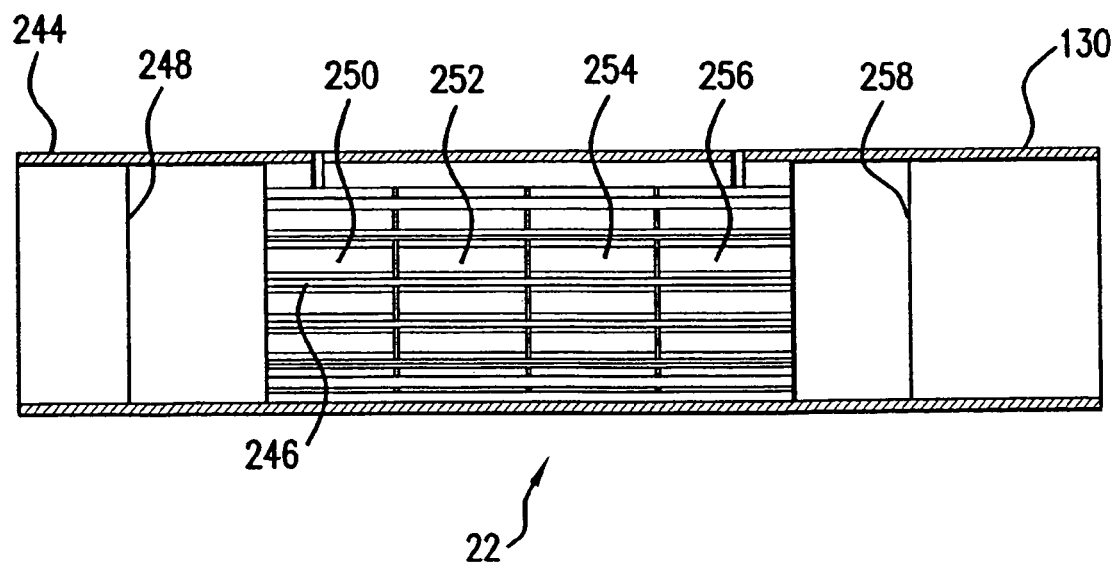

FIGS. 7 and 8 show an exemplary rotor assembly. A set of permanent magnets 241, 242, 250, 252, 254, 256 is secured over, e.g., a ten inch length in the axial, i.e., longitudinal, direction onto the inside of the cylindrical roller housing 130 to form the rotor 22. Each magnet has either north or south polarity and arranged in an alternative sequence of north-pole 241 then south pole 242, etc. There may be gaps, e.g., 240, 246 between the magnets. The rotor rotates and is supported by the end caps 18, 34, which are pressed in and stopped at raised edges 248, 258 inside the roller housing 130. The locations of raised edges 248, 258 here are only for illustrative purposes and may vary along the axial roller direction. The rotor preferably has either 16 or 8 poles with a 21-slot stator configuration.

Figure 9:
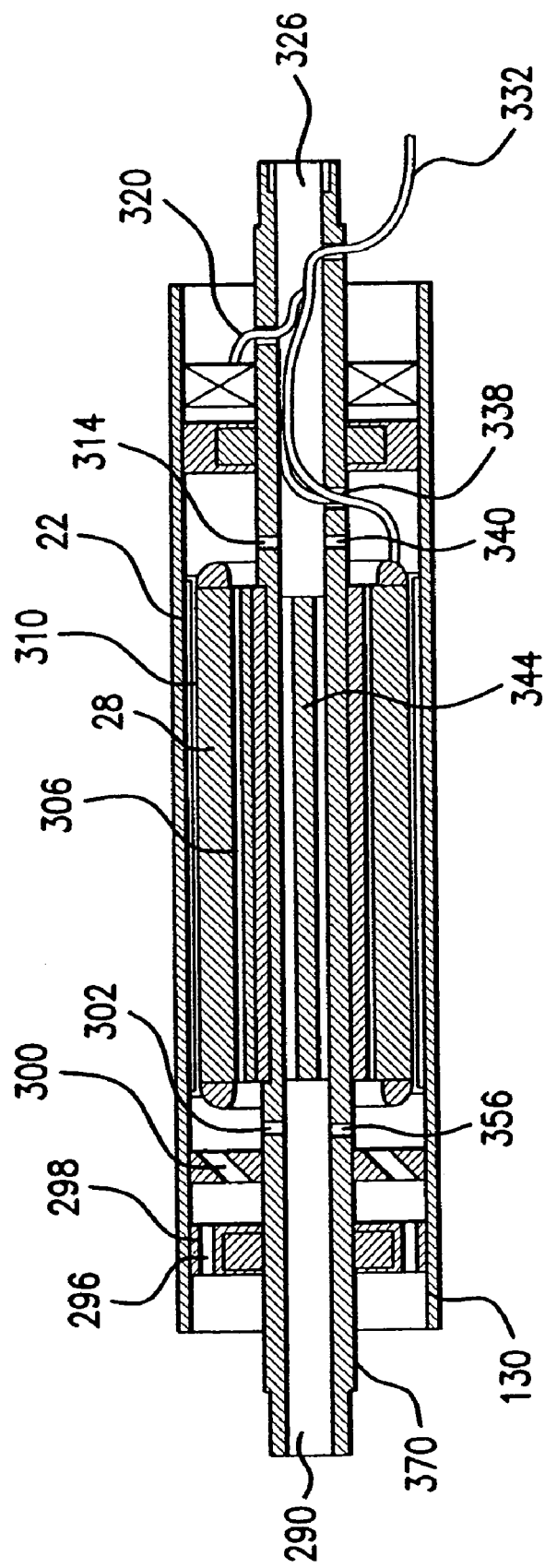
FIG. 9 is a sectional view along the shaft longitudinal axis showing variations in motor cooling methods.
Figure 10:
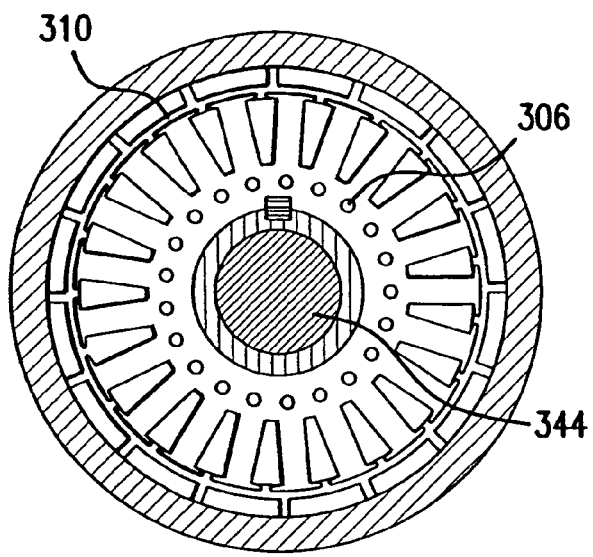
FIG. 10 is a cross section view of the motor with variations of the motor cooling methods.

FIGS. 9 and 10 depict motor cooling configuration. Cooling air flows in from a first end 326 of a semi-hollow tubular shaft 370 having a solid insertion rod 344 placed therein, then flows out a second end 290. A portion of the cooling air may flow through first end holes 314, 340 in the shaft wall then through a air gap 310, then through second end holes 302, 356, then finally flow out through the second end of the shaft 290. A set of additional holes 296 through end cap 298 may assist cooling-air to exit and carry heat away.

The shape or arrangement, or both, of the holes 296 on the end cap 298 can be designed to assist airflow away from the motor inside housing, especially when motor runs at higher speed. In addition, or alternatively, a fan type device 300 such as a concentric series of fan or propeller blades, or the like, can be secured to the rotating roller housing 130, or secured to the end cap 298, which is also rotating, to assist in the movement of air.

A set of longitudinal holes or stator coolant channels 306 through the stator core lamination stack can allow air flow through, thus further removing heat. In this case, the cooling-air flows in from the first end 326 of the semi-hollow shaft 370, then through the first end holes 314, 340 of the shaft, then through both air gap 310 and lamination holes 306, then through the second end holes 302, 356 of the shaft or holes on the end-cap 296, or both, to carry heat away.

Effective cooling methods can improve motor performance greatly in terms of efficiency, motor power density, motor size and the life of the motor. The temperature of the motor may also have direct impact on other components such as the belt on treadmill and conveyor. Therefore, the illustrated cooling methods and its variations herein are important objects of the present invention.

Motor cogging torque can have a great effect on the smoothness of the motor operation, especially in treadmill application. Referring to FIG. 6, cogging torque is due to the interaction between the rotor magnets 132, 134 and slots 139 of the stator 28. The cogging torque can be identified as Tcog=−½ φg2 dR/dθ, where φg is the air gap flux and R is the net reluctance seen by the flux φg. The primary component of R is the air gap reluctance Rg. Therefore if the air gap reluctance varies with position, cogging torque will be generated. Setting φg to zero is not possible since φg must be maximized to produce the desired motor mutual torque. Thus, the cogging torque can only be eliminated by making the air gap reluctance constant with respect to position.

Therefore, in order to provide smoother motor and belt performance, some embodiments of the motor of the present invention may use fractional pitch winding configuration, which reduces the net cogging torque by making the contribution of the dR/dθ from each magnet pole out of phase with those of the other magnets. The basic idea is to arrange the number combination of the stator slots and rotor magnets, such that, the overall magnetic flux distribution will remain unchanged or the change is minimized, while the rotor is rotating. In the ideal case, the cogging torque sums to zero at all positions. In reality, however, some residual cogging torque remains. FIG. 6 shows a 21 slot and 16 pole fractional pitch winding configuration. Variations of the fractional pitch-winding configuration include 15-slot stator for smaller diameter motors and 27 slot stator for larger diameter motors. The number of magnet poles may vary as necessary with each configuration.

Figure 11:
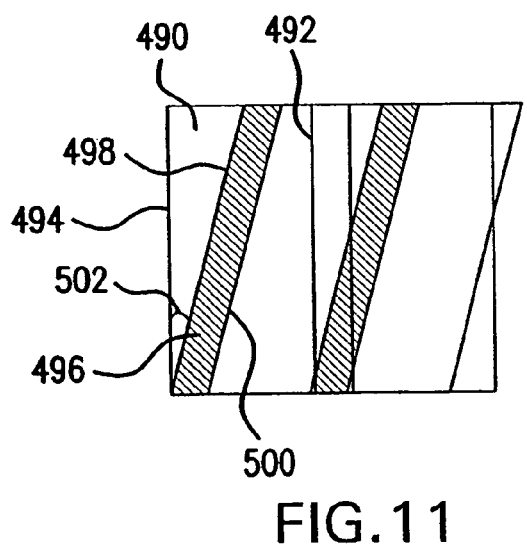
FIG. 11 illustrates skewing of the motor stator.

Referring to FIG. 11, the technique of skewing may also be used within the present invention to reduce cogging torque. This technique can be accomplished by slanting or skewing the slot edges 498, 500 of a slot 496 with respect to the magnet edges 492, 494 of a magnet 490. Also, this technique can be accomplished by skewing the magnets. The idea of skewing is to let the relative position of the slot and magnet to be different for different sections of the motor. Thus the cogging torque generated in different sections of the motor will tend to cancel each other.

Figure 12:
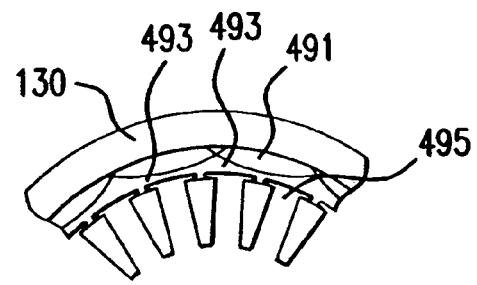
FIG. 12 illustrates cross section view of shaped magnet.

Referring to FIG. 12, the technique of magnet shaping may also be used within the present invention to reducing cogging torque by controlling the shape of the cross section of the magnets 491. Usually finite element analysis is required for magnet shaping design. By shaping the magnets, the air gap 493 between the stator tooth lamination 495 and the magnets 491 will no longer be even. Then the magnet flux distribution will tend to create a smaller cogging torque. Thus, fractional pitch winding techniques, skewing techniques, magnet shaping or combinations of them, can reduce cogging torque significantly.

In treadmill applications, load varies significantly when people walking or running on it. Traditionally a flywheel is used to reduce or smooth the speed variation as load changes. By using the outer rotor motor belt driving system, the flywheel is no longer needed. However this poses higher requirements on the motor controller system to provide fast torque response and achieve accurate speed control.

Figure 13:
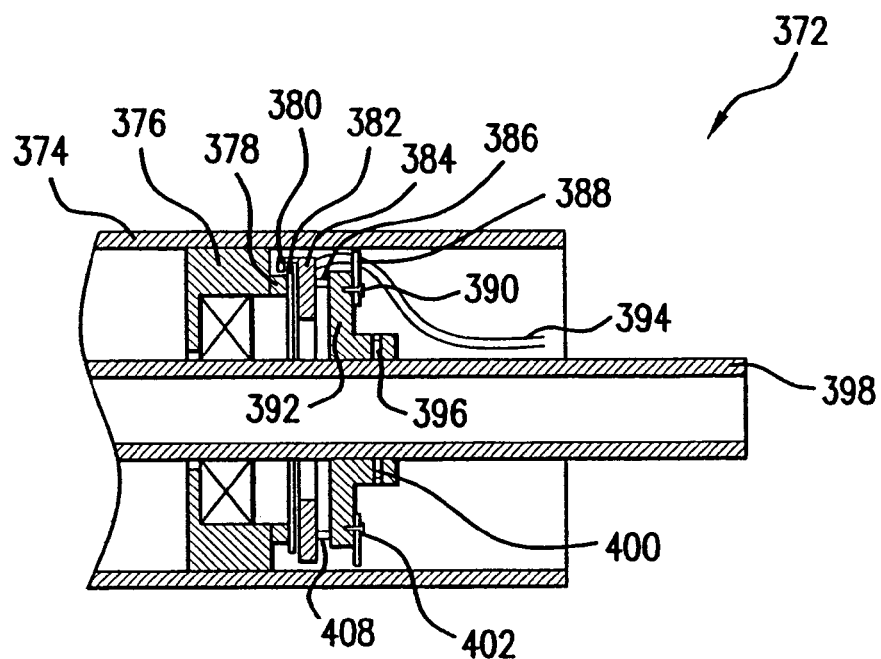
FIG. 13 illustrates an encoder assembly structure.

There are at least two types of high resolution rotor position sensing devices that are suitable for use in outer rotor motor applications according to the invention. First such device is encoder. An encoder 372 is shown in FIG. 13. The encoder 372 consists of a collar 378, a disk 382, a hub 392, a LED 380 and a sensing circuit PCB 384. The pass-through LED 380 and sensing circuit PCB 384 may be a commercially available integrated module. The collar 378 is firmly attached to the end cap 376 or roller housing 374 and rotates with either. The disk 382 is attached firmly to the collar 378. The collar 378 may be a part of the structure of end cap 376 or roller housing 374 so it rotates. The hub 392 is non-rotatably, firmly mounted to the shaft 398 by setscrews 396,400. The LED 380 and sensing circuit PCB 384 are attached to the hub by screws 386, 408. As an alternative mounting method, the LED and sensing circuit can also be mounted over the disk from the inner diameter instead of outer diameter. The disk 382 can be made of either glass or film type materials depending on the temperature requirements. The encoder disk can also have commutation channels build in thus to eliminate the Hall sensor devices. Encoder can provide higher resolution of motor rotor position information, e.g., over 1000 lines per revolution.

A dust cover 388 is attached to the hub by screws 390, 402 to prevent foreign objects from contaminating the encoder. The dust cover 388 can also be attached to the roller. In this case, it will rotate with the roller. The encoder 372 could be mounted either inside the end cap 376 or outside the end cap 376.

Figure 14:
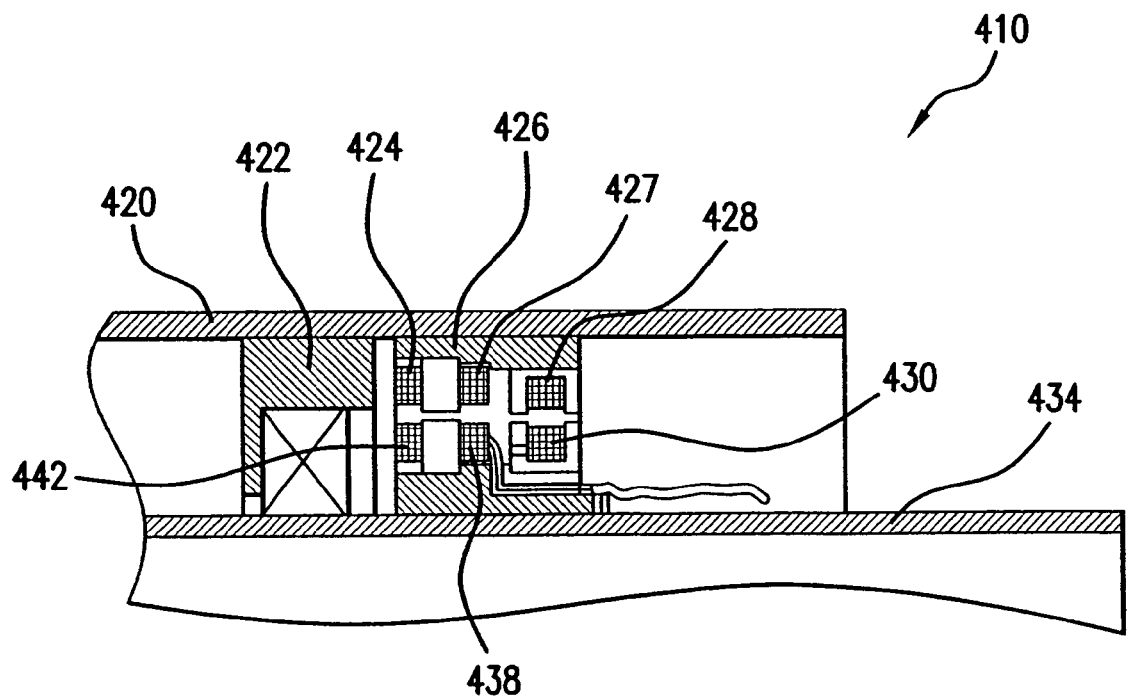
FIG. 14 illustrates the resolver assembly structure.

A second such higher resolution rotor position sensing device can be a resolver 410 as shown in FIG. 14. It is suitable for use with the present invention to provide rotor position and speed information. A resolver stator includes stator winding 442, 438 and winding transformer 430. It is mounted on the motor shaft 434. A resolver rotor includes rotor winding 424, 427 transformer winding 428, and housing 426. It is mounted to the roller housing 420. Resolvers may be considered as inductive position sensors, which have their own rotor windings 424, 427 and stator windings 442, 438 which are shifted by 90 degrees. The windings transfer energy from stator to rotor by means of an auxiliary rotary transformer 428, 430. No slip ring and brush are necessary, therefore reducing the cost and increasing the reliability of the device.

Figure 15:
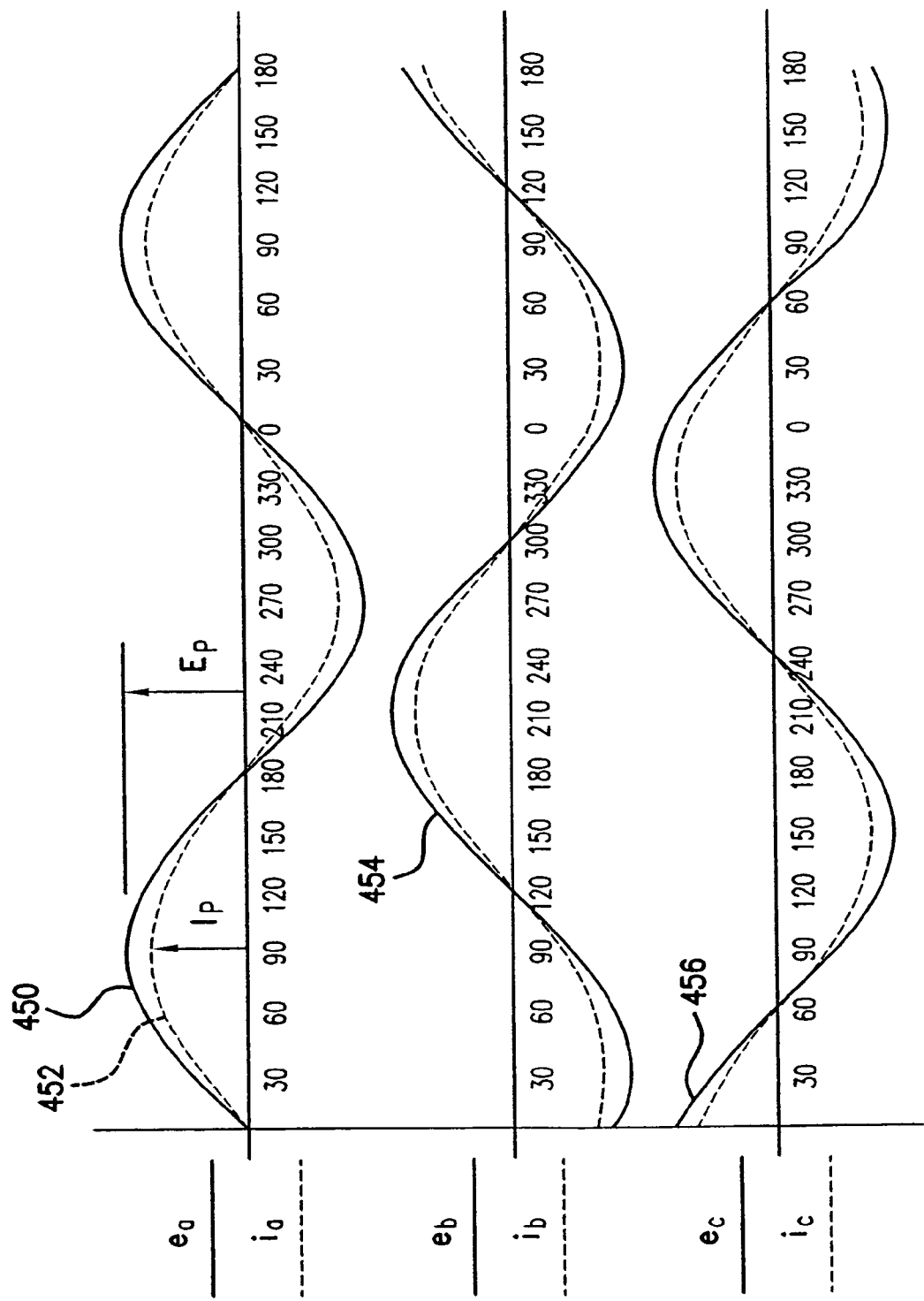
FIG. 15 illustrates the back EMF and current waveforms.

FIG. 15 shows the three phase sinusoidal back EMF waveforms 450, 454, 456 and motor phase current waveforms 452. The outer-rotor motor of the present invention is designed to have three phase sinusoidal back EMF 450, 454 and 456 for treadmill applications. The motor controller is designed to have a sinusoidal current waveform 452 that matches with the motor sinusoidal phase back EMF and achieves the minimum torque ripple and fast torque response.

Figure 16:
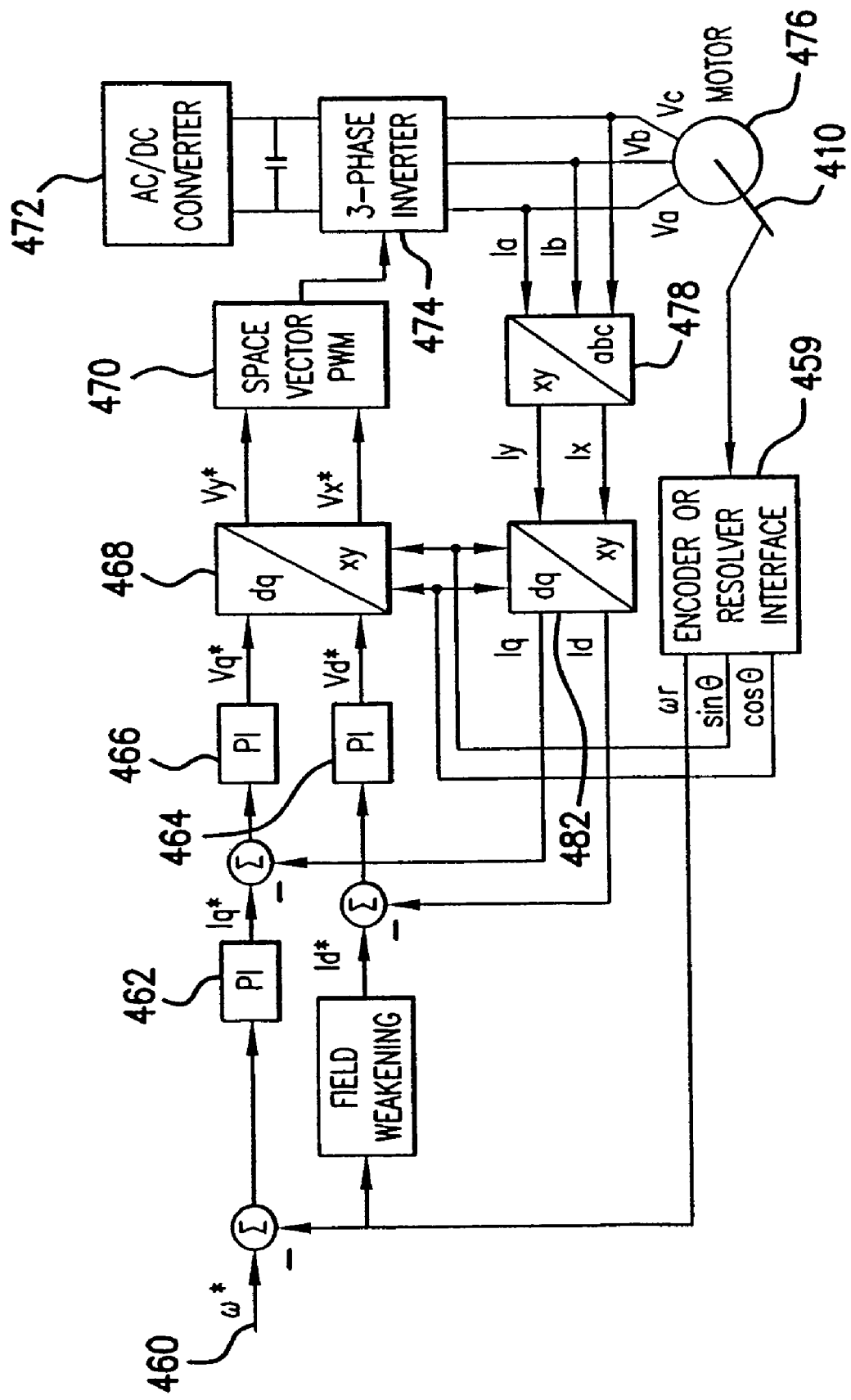
FIG. 16 is a control block diagram of the field orientation control for a motor controller.

FIG. 16 is a block diagram of motor controller 50. Advanced field orientation control algorithms for permanent magnet synchronous motors can be used to achieve fast torque response and accurate speed control. A speed command 460 is taken from the high level control system 25 such as input from the user controls 8 on a treadmill control panel 4. A high resolution speed feedback signal is derived from either the encoder 372, or the resolver 410, at the feedback interface 459. The difference between the speed command and the speed feedback is the input of the speed regulator 462. The speed regulator 462 may use PID or PI control algorithms. A feed forward controller may be added to the speed regulator 462 to further improve speed response. The output of the speed regulator is a torque current command in synchronous frame. A current sensing device senses at least two phases of motor currents. Then the phase current is transferred into synchronous frames from stationary frame by blocks 478, 482. The difference between current commands and current feedbacks is the input of the current regulators 464, 466. The current regulators 464, 466 can be a simple PI regulator. The outputs of the current regulators 464, 466 are the voltage commands in synchronous frame. The voltage commands in synchronous frames are transferred to voltage commands in stationary frame by block 468. The voltage command in stationary frame is the input of the Space Vector PWM (SVPWM) module 470. The SVPWM generates six PWM signals that control the six IGBT power devices of the inverter 474 powered by an AC/DC converter 472. The three phase outputs of the inverter are connected to the outer-rotor motor 476.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An exercise treadmill, comprising:
   a) a frame structure including a first side frame and a second side frame;
   b) a first pulley and a second pulley positioned substantially parallel to each other, each of the first and second pulleys rotatably secured at a first pulley end to the first side frame and at a second pulley end opposite the first end to the second side frame;
   c) a belt secured over said pulleys so as to move in a longitudinal direction when said first pulley is rotated;
   d) a control system;
   e) a control panel secured to said frame structure and operatively connected to said control system wherein said control panel includes at least one display and a set of user controls effective to permit a user to control the speed of said belt; and
   f) a motor, integral with and for rotating said first pulley wherein said motor includes:
      i) a rotor having a housing that forms a generally cylindrical outer surface for said first pulley and includes a plurality of permanent magnets forming a set of poles secured to and spaced about the inner circumference of said housing,
      ii) a stator shaft extending through said rotor and fixed to said frame structure, said shaft having a first shaft end disposed within the first side frame and a second shaft end opposite the first shaft end and disposed within the second side frame,
      iii) a coolant channel within said shaft and extending from the first shaft end to the second shaft end and adapted to permit air to flow from within the first side frame to within the second side frame along said coolant channel effective to provide convective cooling of said motor,
      iv) a stator configured with a plurality of slots fixed to said stator shaft and forming an air gap with said poles,
      v) a plurality of stator windings wound through said slots, and
      vi) at least one bearing secured between said stator shaft and said rotor for permitting said rotor to rotate with respect to said stator shaft; and
   g) a motor controller operatively connected to said control system for controlling the speed of said motor.

2. The treadmill of claim 1 wherein said coolant channel is concentric with said stator shaft and has a generally circular cross section.

3. The treadmill of claim 1 wherein said stator shaft additionally includes a plurality of apertures extending from said coolant channel to the outer surface of said stator shaft effective to permit at least portion of said coolant to flow from said coolant channel through said air gap.

4. The treadmill of claim 1 additionally comprising a thermally conductive member located within said coolant channel.

5. The treadmill of claim 4 wherein said thermally conductive member is configured so as to permit at least a portion of said air to flow through said thermally conductive member.

6. The treadmill of claim 5 wherein said thermally conductive member includes surface areas in contact with said air that are greater than the corresponding surface area of said coolant channel where said conductive member is located.

7. The treadmill of claim 4 wherein said thermally conductive member includes a plurality of fins extending longitudinally along said coolant channel that from said surface areas.

8. The treadmill of claim 1 wherein said motor includes at least one end cap which is configured with at least one aperture to permit said air to flow out of said rotor.

9. The treadmill of claim 1 wherein said motor includes at least one end cap which is sealed against air flow through said end cap.

10. The treadmill of claim 1 wherein said stator is configured with a plurality of stator coolant channels so as to permit at least a portion of said coolant to flow through said stator.

11. The treadmill of claim 1 wherein said coolant channel is configured in the outer surface of said stator shaft.

12. The treadmill of claim 1 additionally including a coolant transfer mechanism connected to one of the fast and second ends of said stator shaft for transferring said air through said coolant channel.

13. The treadmill of claim 12 wherein said transfer mechanism includes a fan or a blower disposed within one of the first and second side frames.

14. The treadmill of claim 13, wherein the fan or blower operates independently of the rotor.

15. The treadmill of claim 1, additionally comprising a clamping mechanism at each of the first pulley end and the second pulley end, the clamping mechanism including a resilient material adjacent the shaft and effective to insulate said frame structure from vibrations and heat generated by said motor.

16. The treadmill of claim 1, wherein each of said first and said second frame structure comprises at least one air ventilation aperture.

17. The treadmill of claim 1 additionally comprising a fan or a blower disposed within one of the first and second side frames; and
   a thermally conductive member located within said coolant channel, wherein said thermally conductive member includes a plurality of fins extending longitudinally along said coolant channel.

18. The treadmill of claim 17, wherein each of said first and said second frame structure comprises at least one air ventilation aperture, and said stator shaft additionally includes a plurality of apertures extending from said coolant channel to the outer surface of said stator shaft effective to permit at least portion of said coolant to flow from said coolant channel through said air gap.

19. The treadmill of claim 1, additionally comprising a high resolution sensing mechanism operatively connected to said rotor for generating a rotor position information signal, wherein the motor controller is operatively connected to said control system and said sensing mechanism responsive to said speed command signal in combination with said rotor speed, and position signals to apply power to said stator windings for controlling the speed of said motor to achieve said desired belt speed.

20. The treadmill of claim 19, wherein said sensing mechanism includes an optical encoder.

21. The treadmill of claim 19, wherein said sensing mechanism includes a resolver including a resolver rotor secured for rotation with said rotor and a resolver stator secured to said stator shaft.

22. The treadmill of claim 1, wherein said motor is configured to minimize cogging torque wherein said configuration is selected from the group consisting of said stator windings having a fractional pitch, said stator slots orientated in a skewed relationship with said the edges of said permanent magnets, and said magnets are shaped so as to result in a substantially sinusoidally distributed magnetic flux in said air gap.

23. The treadmill of claim 1, wherein said stator windings have a fractional pitch and said plurality of slots are orientated in a skewed relationship with said edges of said permanent magnets.

24. The treadmill of claim 1, wherein there are 21 of said stator slots and 8 or 16 of said poles.

25. An exercise treadmill, comprising:
   a) a frame structure having a first end and a second end opposite the first end, and the frame structure including a first side frame and a second side frame;
   b) a first and a second pulley, said pulleys rotatably secured to said frame structure and positioned substantially parallel to each other, said first pulley is rotatably secured to the second end of said frame structure;
   c) a belt secured over said pulleys so as to move in a longitudinal direction when said first pulley is rotated;
   d) a control system;
   e) a control panel secured to the first end of said frame structure and operatively connected to said control system wherein said control panel includes at least one display and a set of user controls effective to permit a user to control the speed of said belt; and
   f) a motor, integral with and for rotating said first pulley wherein said motor includes:
      i) a rotor having a housing that forms a generally cylindrical outer surface for said first pulley and includes a plurality of permanent magnets forming a set of poles secured to and spaced about the inner circumference of said housing,
      ii) a stator shaft extending through said rotor, said shaft including a coolant channel having a first end disposed within the first side frame and a second end opposite the first end and disposed within the second side frame, wherein the coolant channel is adapted to permit said coolant to flow from within the first side frame to within the second side frame,
      iii) a stator configured with a plurality of slots fixed to said stator shaft and forming an air gap with said poles,
      iv) a plurality of stator windings wound through said slots, and
      v) at least one bearing secured between said stator shaft and said rotor for permitting said rotor to rotate with respect to said stator shaft; and
   g) a motor controller operatively connected to said control system for controlling the speed of said motor.

26. The treadmill of claim 25 additionally including a fan or a blower disposed within one of the first and second side frames and connected to one of the first and second ends of said stator shaft for transferring said coolant through said coolant channel.

27. The treadmill of claim 25 additionally comprising a thermally conductive member located within said coolant channel, wherein said thermally conductive member includes a plurality of fins extending longitudinally along said coolant channel.

28. The treadmill of claim 25 additionally comprising a thermally conductive member located within said coolant channel.

29. The treadmill of claim 28 wherein said thermally conductive member is configured so as to permit at least a portion of said coolant to flow through said thermally conductive member.

30. The treadmill of claim 28 wherein said thermally conductive member includes a plurality of fins extending longitudinally along said coolant channel.

31. An exercise treadmill, comprising:
   a) a first and a second frame structure, wherein said first and said second frame structure each is configured with at least one aperture;
   b) a first and a second pulley, said pulleys rotatably secured to said frame structures and positioned substantially parallel to each other;
   c) a belt secured over said pulleys so as to move in a longitudinal direction when said first pulley is rotated;
   d) a control system;
   e) a control panel secured to said frame structure and operatively connected to said control system wherein said control panel includes at least one display and a set of user controls effective to permit a user to control the speed of said belt; and
   f) a motor, integral with and for rotating said first pulley wherein said motor includes:
      i) a rotor having a housing that forms a generally cylindrical outer surface for said first pulley and includes a plurality of permanent magnets forming a set of poles secured to and spaced about the inner circumference of said housing,
ii) a heat transfer coolant,
iii) a stator shaft extending through said rotor and fixed at each end to and within said first and said second frame structures respectively, wherein at least a portion of said shaft is configured with a coolant channel adapted to permit said coolant to flow along said coolant channel and through said apertures in said frame structures effective to provide convective cooling of said motor,
iv) a stator configured with a plurality of slots fixed to said stator shaft and forming an air gap with said poles,
v) a plurality of stator windings wound through said slots, and
vi) at least one bearing secured between said stator shaft and said rotor for permitting said rotor to rotate with respect to said stator shaft;

g) a motor controller operatively connected to said control system for controlling the speed of said motor; and h) a fan or a blower disposed within one of the first and second frame structures and connected to one of the ends of said stator shaft for transferring said coolant through said coolant channel.

32. The treadmill of claim 31 wherein said motor controller is secured within said first frame structure.

33. The treadmill of claim 31 wherein said stator shalt additionally includes a plurality of apertures extending from said coolant channel to the outer surface of said stator shaft effective to permit at least portion of said coolant to flow from said coolant channel through said air gap.

34. The treadmill of claim 31 additionally comprising a thermally conductive member located within said coolant channel.

35. The treadmill of claim 34 wherein said thermally conductive member is configured so as to permit at least a portion of said coolant to flow through said thermally conductive member.

36. The treadmill of claim 34 wherein said thermally conductive member includes a plurality of fins extending longitudinally along said coolant channel.

* * * * *